United States Patent [19]

Harvell

[11] 4,179,632

[45] Dec. 18, 1979

[54] SPINDLE LOCKING MECHANISM FOR A ROTARY POWER DEVICE

[75] Inventor: Don L. Harvell, Greenville, S.C.

[73] Assignee: The Singer Company, New York, N.Y.

[21] Appl. No.: 967,176

[22] Filed: Dec. 6, 1978

[51] Int. Cl.$^2$ .............................................. H02K 7/14
[52] U.S. Cl. .................................. 310/50; 310/75 R; 403/324; 403/328
[58] Field of Search ..................................... 310/46–48, 310/50, 75 R, 75 D, 89; 403/108, 324, 328, 379

[56] References Cited

U.S. PATENT DOCUMENTS

| | | | |
|---|---|---|---|
| 3,669,463 | 6/1972 | Boudreau | 403/328 X |
| 3,679,244 | 7/1972 | Reddy | 403/328 X |
| 3,685,865 | 8/1972 | Young | 403/328 X |
| 3,752,514 | 8/1973 | Schoeps | 403/328 X |
| 3,873,863 | 3/1975 | Pew | 310/50 |
| 3,948,547 | 4/1976 | Gache | 403/328 X |

Primary Examiner—Mark O. Budd
Attorney, Agent, or Firm—Edward L. Bell; Robert E. Smith; Lawrence E. Sklar

[57] ABSTRACT

The instant invention provides a manually operable locking mechanism for a rotary power tool. The locking mechanism comprises a housing for the rotary power tool, the housing having an opening therein, a spindle rotatably mounted within the housing, the spindle having a radially extending aperture in axial alignment with the housing opening, a loop spring disposed adjacent the housing, the loop spring having a hole in alignment with the opening in the housing, and a lock pin. The lock pin includes an outer section slidingly engaging the opening in the housing, a manually engageable button at its outer end extending radially outwardly from the housing, and a shaft at its inner end extending radially inwardly of the housing and through the hole of the loop spring. The locking mechanism further comprises means connected to the lock pin for collapsing the loop spring radially inwardly so that, when the aperture in the spindle is aligned with the lock pin, the shaft of the lock pin may enter said aperture and thereby prevent rotation of the spindle.

7 Claims, 5 Drawing Figures

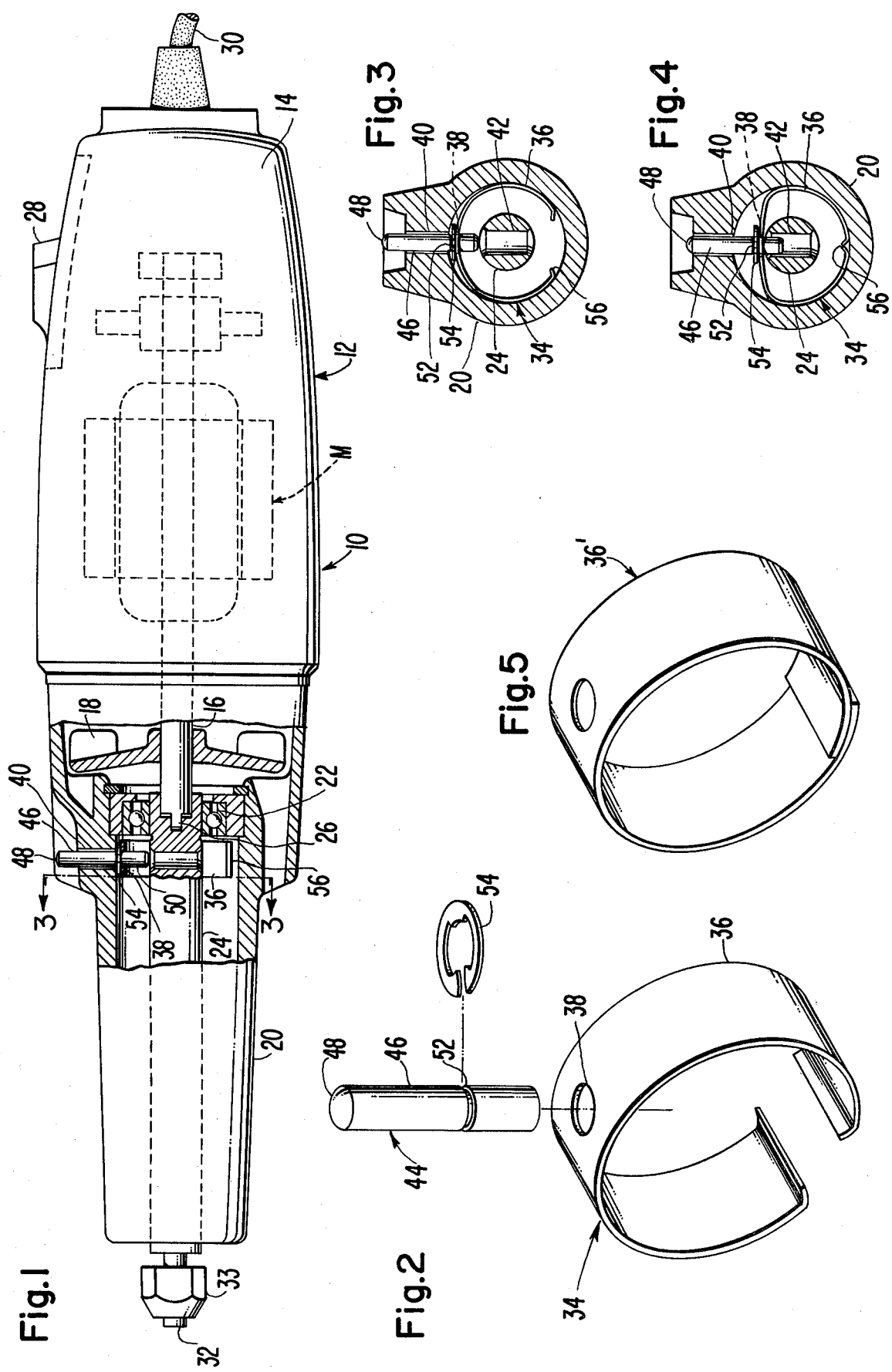

SPINDLE LOCKING MECHANISM FOR A ROTARY POWER DEVICE

BACKGROUND OF THE INVENTION

The present invention relates to a locking mechanism for a rotary power device and, more particularly, to a manually operable locking mechanism for a rotary power tool which permits a rotatable spindle of the tool to be temporarily locked against rotation to allow attachments to be safely connected to and removed from the spindle.

In the field of rotary devices, e.g., hand operated electric drills, sanders, and polishers, it has been proposed to provide locking mechanisms which permit an operator to temporarily lock the device against rotation to allow safe handling of accessories, e.g., drill chucks, sanding discs, and polishing wheels, to be attached to and removed from the power devices. The prior art shows various shaft locking mechanisms using spring devices, such as the coil spring and lock pin shown in U.S. Pat. No. 3,873,863 issued to The Singer Company, the assignee of the instant invention. When using a coil spring, the spring must be fitted between the spindle and the housing of the rotary power device, which space is generally too small to be able to accommodate a strong and sturdy coil spring which will perform adequately over the life of the power tool. The instant invention overcomes the problems inherent with using a coil spring and locking pin to lock the spindle of a rotary power tool.

SUMMARY OF THE INVENTION

The instant invention provides a manually operable locking mechanism for a rotary power tool. The locking mechanism comprises a housing for the rotary power tool, the housing having an opening therein, a spindle rotatably mounted within the housing, the spindle having a radially extending aperture in axial alignment with the housing opening, a loop spring disposed adjacent the housing, the loop spring having a hole in alignment with the opening in the housing, and a lock pin. The lock pin includes an outer section slidingly engaging the opening in the housing, a manually engageable button at its outer end extending radially outwardly from the housing, and a shaft at its inner end extending radially inwardly of the housing and through the hole of the loop spring. The locking mechanism further comprises means connected to the lock pin for collapsing the loop spring radially inwardly so that, when the aperture in the spindle is aligned with the lock pin, the shaft of the lock pin may enter said aperture and thereby prevent rotation of the spindle.

BRIEF DESCRIPTION OF THE DRAWINGS

FIG. 1 is a side view of an electrically powered hand tool with part of the tool housing broken away to show the locking mechanism of the instant invention;

FIG. 2 is an enlarged, exploded, perspective view showing the relationship between the lock pin, loop spring and retaining ring seen in FIG. 1;

FIG. 3 is an enlarged, sectional view taken on the horizontal plane indicated by the line 3—3 in FIG. 1;

FIG. 4 is similar to FIG. 3, but it shows the lock pin engaging the spindle;

FIG. 5 is an enlarged, perspective view of an alternative embodiment of a loop spring.

DESCRIPTION OF THE PREFERRED EMBODIMENT

In describing the preferred embodiment of the instant invention, reference is made to the drawings, particularly FIG. 1, wherein there is seen an electrically powered hand tool 10 in the form of a variable speed hand grinder. It will, of course, be understood that the grinder is but one typical example of a power tool or appliance to which the present invention is applicable. The hand tool 10 has a housing or casing 12 which may be formed of a dielectric material or of a metal. The functional insulation for the tool 10 can take various forms, as is well known in the art, depending upon whether the housing 12 is made of a plastic or dielectric material or made of metal.

The housing 12 includes a rearward section 14 for mounting a motor M having an armature shaft 16 which carries a fan 18 thereon. The housing 12 also includes a forward section 20 within which are mounted bearings 22. Rotatably mounted within the forward section 20 of the housing 12 is the work spindle 24. The armature shaft 16 extends into the forward section 20 of the housing 12 and possesses configuration whereby it is insertable into a complementary recessed portion 26 of the work spindle 24. The rearward section 14 of the housing 12 is also provided with an electrical switch 28 for connecting the motor M to a source of electric power by means of electric wire 30.

The spindle 24 extends through the front end of the forward housing section 20 and is customarily provided with a collet 32 for securing the working tool element (not shown) to the spindle 24 for rotation. In the case of a hand grinder, a grinding wheel would be fitted to the end of the spindle 24 and locked in place in the collet 32 by collet nut 33.

The hand tool 10 is provided with a locking mechanism generally designated 34, best seen in FIG. 2, comprising a C-shaped loop spring 36 having a hole 38 in alignment with an opening 40 in the housing 12. The work spindle 24 also includes a radially extending aperture 42 in axial alignment with the housing opening 40. The loop spring hole 38 is also in alignment with the housing opening 40.

The locking mechanism 34 further comprises a lock pin 44 which includes an outer section 46, a manually engageable button 48 at its outer end and a shaft 50 at its inner end. Between the outer section 46 and the shaft 50 of the lock pin 44 is a channel 52 which receives a retaining ring 54.

As best seen in FIGS. 3 and 4, the loop spring 36 is disposed adjacent the housing 12 with the loop spring hole 38 in alignment with the housing opening 40. The loop spring 36 biases the retaining ring 54 and hence the lock pin 44 radially outwardly so that the button 48 is projected radially beyond the housing 12. The ends 56 of the loop spring 36 are bent radially inwardly from the inner circumference of the housing 12 so that when the spring 36 is compressed by the action of the lock pin 44, the ends 56 do not pass each other and diminish the effectiveness of the loop spring 36. The outer section 46 of the lock pin 44 slidingly engages the housing opening 40 while the shaft 50 of the lock pin 44 extends radially inwardly of the housing 12 and through the loop spring hole 38. The retaining ring 54, which seats in the channel 52, is situated between the housing 12 and the loop spring 36 so that when the spindle aperture 42 is aligned with the lock pin 44, the operator of the hand tool 10, by pressing the lock pin button 48 inwardly, engages the spindle aperture 42 with the shaft 50 of the lock pin 44, as best seen in FIG. 4, thereby locking the spindle 24 against rotational movement. When the button 48 is released, the loop spring 36 acts to again bias the retaining ring 54 radially outwardly against the housing 12, so that the button 48 again projects radially outwardly from the housing 12, and the shaft 50 is released from engagement with the spindle aperture 42.

The loop spring 36 is preferably formed from steel, as are the lock pin 44 and retaining ring 54. Although the locking mechanism 34 is shown situated at the top of the spindle 24, near armature shaft 16, it may be located virtually anywhere along the length of the spindle 24.

An alernative embodiment of the loop spring 36' is shown in FIG. 5, and is characterized by its O-shape. The alternative embodiment 36' functions in the same manner as the loop spring 36, but does not have its ends bent radially inwardly.

Numerous alterations of the structure herein disclosed will suggest themselves to those skilled in the art. However, it is to be understood that the description relates to a preferred embodiment of the invention which is for purposes of illustration only and is not to be construed as a limitation of the invention. All such modifications which do not depart from the spirit of the invention are intended to be included within the scope of the appended claims.

I claim:

1. A manually operable locking mechanism for a rotary power tool, comprising:

a housing for the rotary power tool, said housing having an opening therein;

a spindle rotatably mounted within the housing, said spindle having a radially extending aperture in axial alignment with the housing opening;

a loop spring disposed adjacent the housing, said spring having a hole in alignment with the opening in the housing;

a lock pin having an outer section slidingly engaging the opening in the housing, a manually engagable button at its outer end extending radially outwardly from the housing, and a shaft at the inner end extending radially inwardly of the housing and through the hole of the loop spring; and means connected to the lock pin for collapsing the loop spring radially inwardly so that, when the aperture in the spindle is aligned with the lock pin, the shaft of the lock pin may enter said aperture and thereby prevent rotation of the spindle.

2. The locking mechanism of claim 1, wherein the collapsing means comprise a channel in the lock pin between the outer section and shaft of the lock pin and a retaining ring seated in said channel between the loop spring and the housing.

3. The locking mechanism of claim 1, wherein the lock pin is situated at the top of the spindle.

4. The locking mechainsm of claim 3, wherein the loop spring and the lock pin are formed from steel.

5. The locking mechanism of claim 4, wherein the loop spring is C-shaped.

6. The locking mechanism of claim 5, wherein the ends of the loop spring are bent radially inwardly from the housing.

7. The locking mechanism of claim 4, wherein the loop spring is O-shaped.

* * * * *